Figure 1:
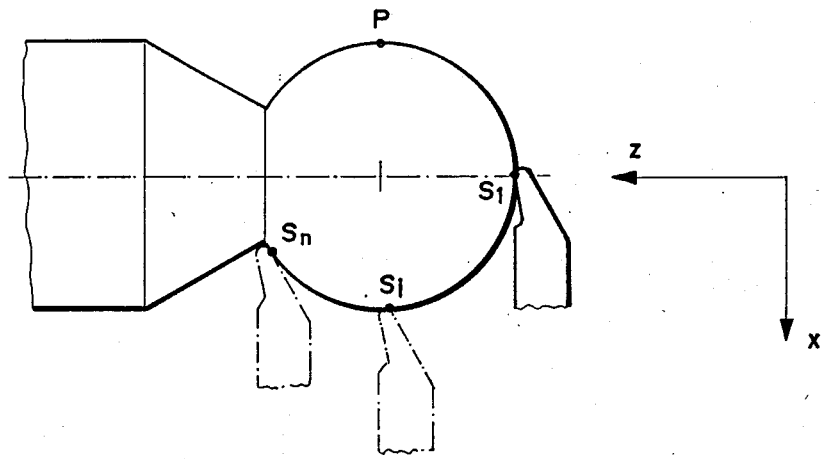

United States Patent [19]
Leiber et al.

[11] Patent Number: 4,887,500
[45] Date of Patent: Dec. 19, 1989

[54] BALL TURNER FOR TURNING LATHES

[75] Inventors: Hans-Jürgen Leiber, Tramelan; Jean-Philippe Meyer, Les Reussilles; Christian F. Kummer, Tramelan, all of Switzerland

[73] Assignee: Kummer Freres SA Fabrique de Machines, Tramelan, Switzerland

[21] Appl. No.: 182,208

[22] Filed: Apr. 15, 1988

[30] Foreign Application Priority Data

Apr. 27, 1987 [CH] Switzerland .................. 1597/87

[51] Int. Cl.$^4$ ................................................ B23B 5/40
[52] U.S. Cl. .......................................... 82/12; 82/18; 82/19
[58] Field of Search ............ 82/11, 12 X, 14 A, 14 B, 82/14 C, 18, 19, 1 C, 14 E, 1.5, 36 R

[56] References Cited

U.S. PATENT DOCUMENTS 3,956,914  5/1976  Prochacka ......................... 82/12
4,083,272  4/1978  Miller .............................. 82/12
4,467,679  8/1984  Johne ............................... 82/36 R

OTHER PUBLICATIONS

Jäger, Helmut, Drehautomaten, 1967, p. 500.

Primary Examiner—Frederick R. Schmidt
Assistant Examiner—Blynn Shideler
Attorney, Agent, or Firm—Oliff & Berridge

[57] ABSTRACT

An auxiliary shaft (16) mounted coaxially with a main shaft (5) has at the top an eccentric (17) operatively connected via grooving (20, 21) to a tool-fastening plate (13). At the bottom of the auxiliary shaft is a wheel (19) fixed to the eccentric and provided with a recess (18). The recess can engage a fixed lug cam so that a feed motor can cause both the rotary movement of the ball turner and a tool correction effected by a relative rotary movement between the main shaft and the auxiliary shaft. For the sake of accuracy, the angular displacement is limited to an area in which the displacement of the tool-fastening plate caused by the eccentric is substantially linear with the angular displacement. All rotary motions are measured during the operation by a shaft encoder (9) and communicated to a CNC system.

9 Claims, 6 Drawing Sheets

BALL TURNER FOR TURNING LATHES

This invention relates to lathe turning, and in particular to a ball turner for turning machines for producing spherical shapes, of the type having a feed motor, a rotary main shaft driven by this motor, a displaceable tool-fastening plate having a toolholder, and shaft encoder means in operative connection with the main shaft.

Workpieces having a shape including spherical portions are known to be producible on turning lathes equipped with a continuous-path control and a cross-slide, without any particular auxiliary attachments. In many cases, the accuracy of shape of such workpieces is sufficient. However, the strictest requirements for accuracy of shape of the spherical portions cannot be met by means of this technique, primarily for two reasons: for one thing, the turning tool always cuts at a different location of its cutting edge depending upon its momentary position (cf. $S_l$, $S_i$, $S_n$ in FIG. 1 of the accompanying drawing). Now, if the cutting edge of the turning tool does not conform to a perfect radius, neither will the machined workpiece have a perfectly spherical shape.

Furthermore, very rigid cross-slides, too, have a reversal error, even in the feed direction. This means that upon a change of direction, the slide does not respond instantly but lingers in its position for a moment. Hence when a spherical shape is turned, the result is a short cylindrical portion (cf. point P of FIG. 1), thus a deviation from the ideal shape.

Those skilled in the art are aware of these problems, and so-called ball turners have long existed for turning highly accurate spherical shapes. Such ball turners are described, for instance, in *Drehautomaten*, by Helmut Jaeger (Munich, Karl-Hanser-Verlag, 1967), p. 500. All these fixtures work according to the same basic principle. The turning tool pivots about a point of rotation, so that the tool always cuts at the same locations of its cutting edge; moreover, the problem of the reversal error such as occurs with a cross-slide is substantially eliminated since the turning tool moves on a circular path, the accuracy of which is determined only by the positioning of the pivot point.

The pivoting movement of the prior art ball turners is either derived from the longitudinal slide or, for example, produced by a hydraulic pivot drive. The pivoting angle is determined in the former case by the longitudinal path of the longitudinal slide, while in the latter case it is set by means of fixed stops. In no event, however, can the pivoting angle be programmed directly by a computer numerical control (CNC) system. Furthermore, in these prior art ball turners, tool wear must be corrected by manual displacement of the turning tool. These are serious drawbacks to flexible automatic production such as is aimed at nowadays.

It is therefore an object of this invention to provide an improved ball turner in which the pivoting angle can be programmed via CNC.

A further object of the invention is to provide a ball turner in which the tool correction necessitated by wear on the tool is also possible by entering the correction value in the CNC system.

Still another object of the invention is to provide a ball turner having the aforementioned advantages which is so compact in its construction that there is no possibility of its conflicting with the chuck or the headstock.

To this end, in the ball turner according to the present invention, of the type initially mentioned, an auxiliary shaft coaxially mounted in the main shaft has at its upper end an eccentric operatively connected to the tool-fastening plate via groove means and at its lower end a wheel connected to the eccentric and provided with a recess, this recess being engageable with a fixed lug cam so that the feed motor can bring about both the rotational movement of the ball turner and the tool correction taking place through relative rotational movement between the main shaft and the auxiliary shaft.

Figure 2:
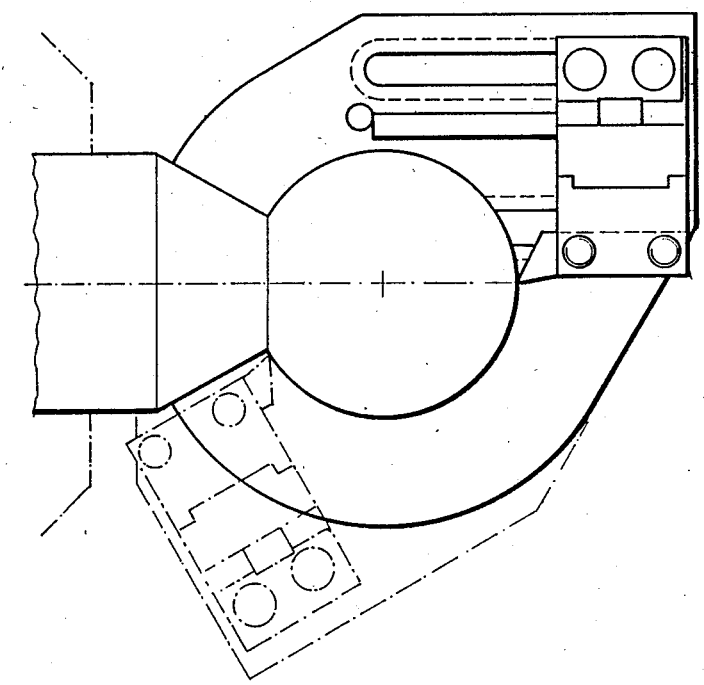

A preferred embodiment of the invention will now be described in detail with reference to the accompanying drawings, in which:

FIGS. 1 and 2 are diagrammatic views illustrating the problems described above

Figure 3:
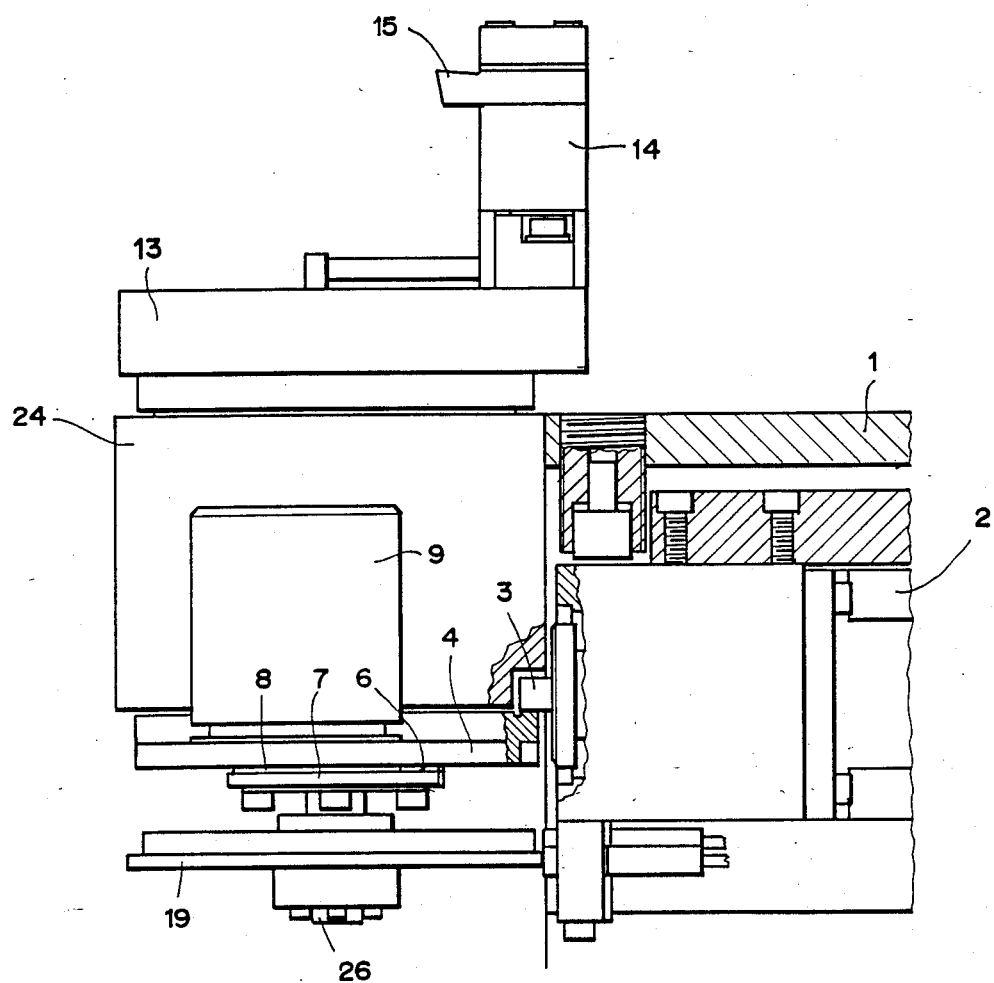
Figure 4:
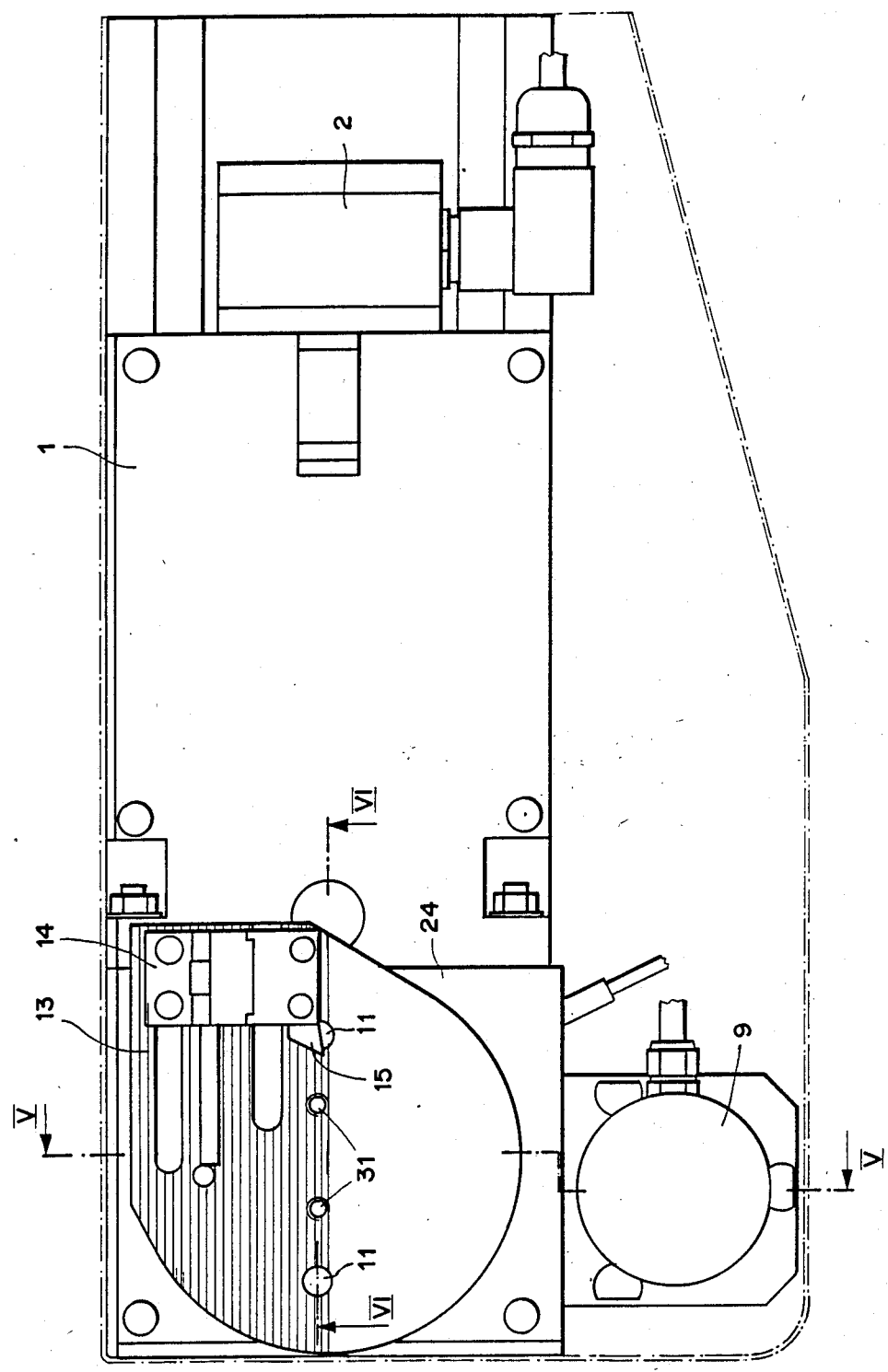
Figure 5:
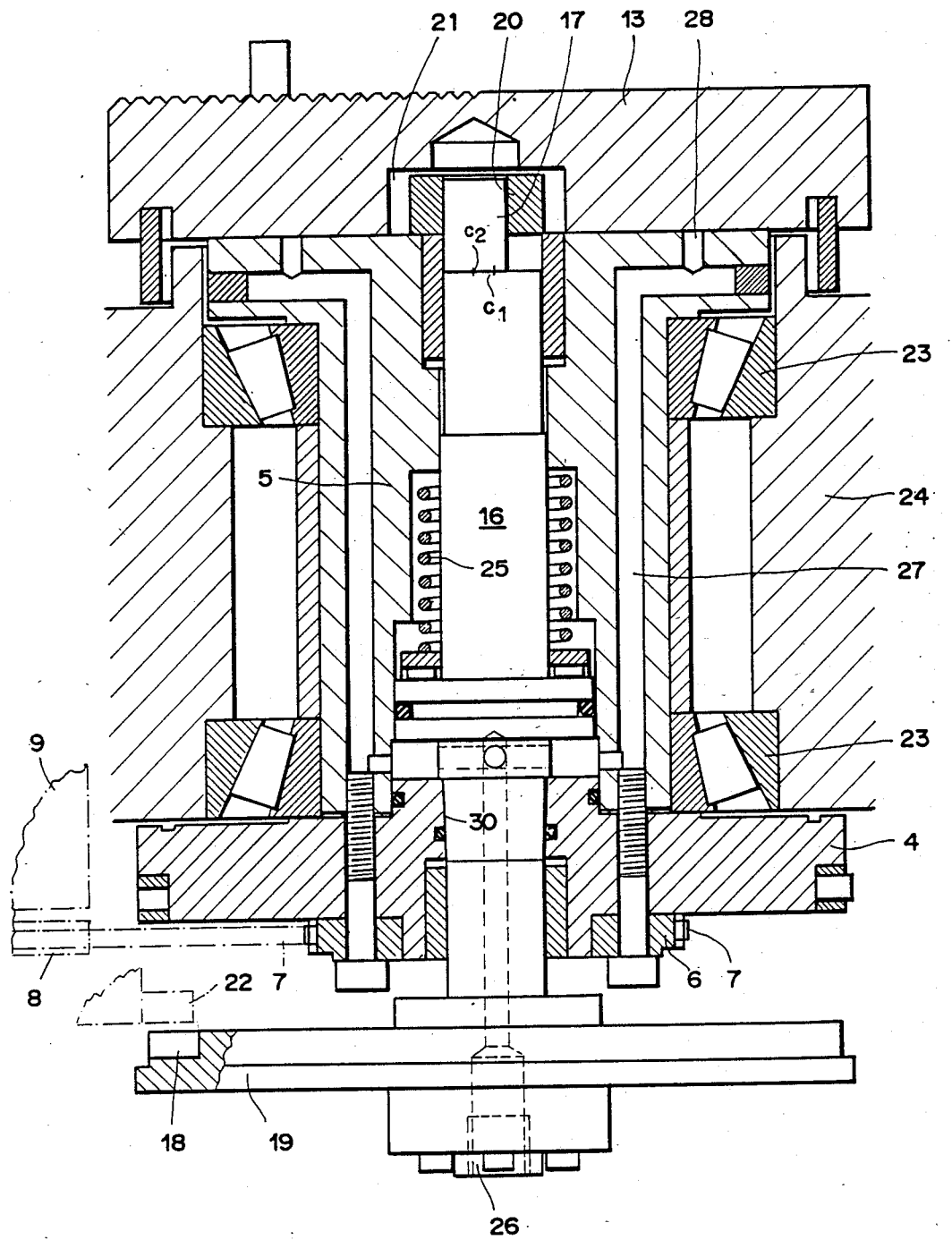
Figure 6:
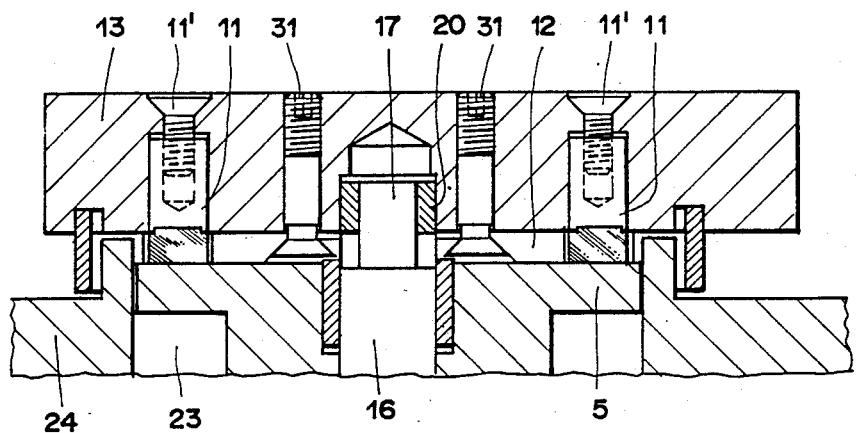
Figure 7:
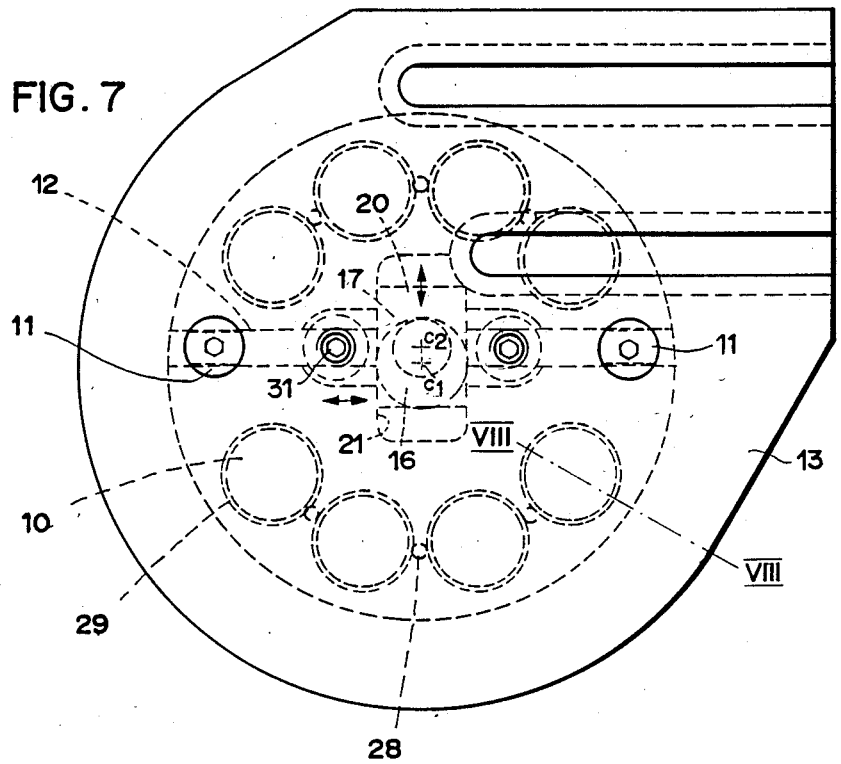
Figure 8:
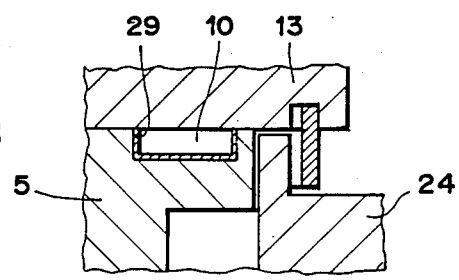
Figure 9:
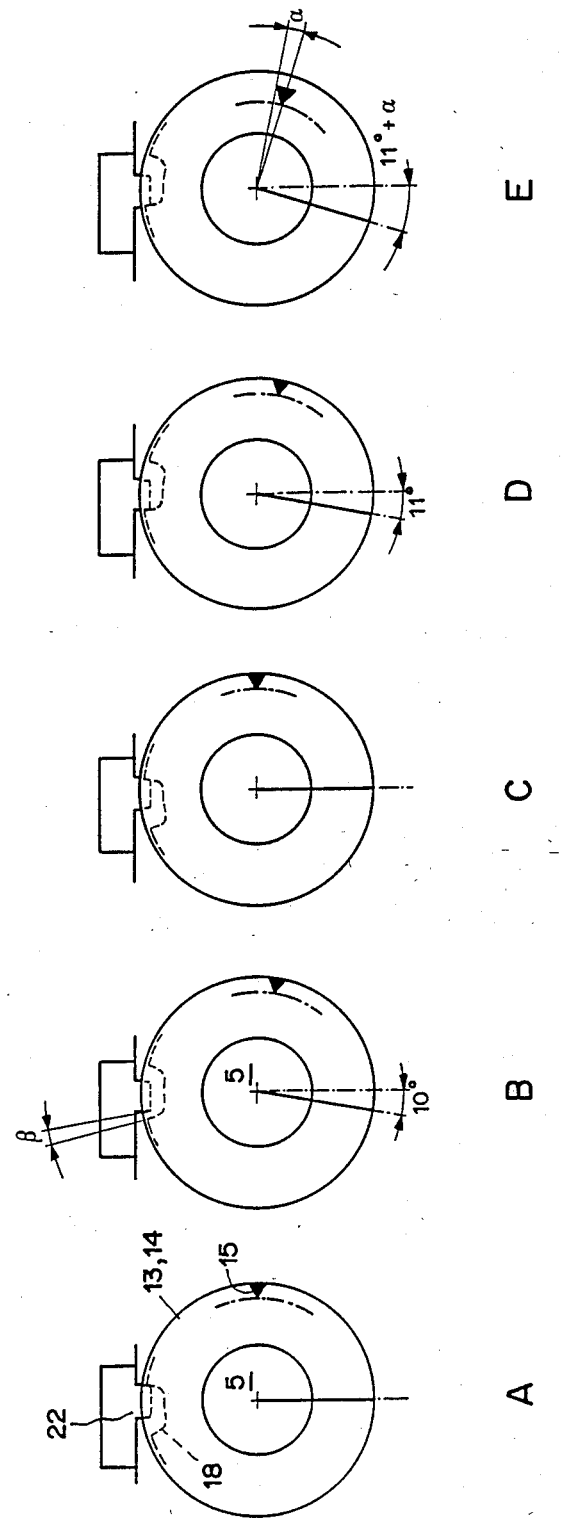

FIG. 3 is an elevation, partially in section, of the ball turner according to the present invention, FIG. 4 is a top plan view of the ball turner, FIG. 5 is a section taken on the line V-V of FIG. 4, FIG. 6 is a section through the tool-fastening plate taken on the line VI-VI of FIG. 4, FIG. 7 is a top plan view of the tool-fastening plate, FIG. 8 is a section taken on the line VIII-VIII of FIG. 7, and FIGS. 9A-9D are diagrammatic views illustrating the tool-correction operation.

FIGS. 3, 4, and 5 show the ball turner preferably mounted on the cross-slide of a turning machine and thus capable of being placed in its operating position as need be like a normal turning tool.

The ball turner essentially consists of a base body 1 by means of which it can be secured to a cross-slide, an electric feed motor 2, a friction gear 3, 4, a shaft 5 fixed to the friction wheel 4 and serving as a main shaft, a shaft encoder 9 operatively connected to friction wheel 4 and shaft 5 via toothed-belt gearing 6, 7, 8, a tool-fastening plate 13 mounted on shaft 5, provided with magnets 10, and guided by means of pins 11, 11 in a groove 12 (FIGS. 6, 7, 8), a toolholder 14 screwed to tool-fastening plate 13, a turning tool 15, an auxiliary shaft 16 mounted in shaft 5 for longitudinal and rotational movement and designed as a piston, with an eccentric shaft 17 secured to its top end and a disk 19 having a groove 1B to its bottom end, and a lug cam 22 secured to body 24. The common axis of rotation of shaft 5 and piston 16 runs through a point $c_1$, that of eccentric shaft 17 through a point $c_2$ (FIGS. 5 and 7). Eccentric shaft 17 further engages a sliding block 20 guided in groove 21 of tool-fastening plate 13.

Shaft 5, mounted in body 24 by means of a roller bearing 23, and with it tool-fastening plate 13 as well as toolholder 14 screwed thereto with its tool 15, are driven by electric feed motor 2 via friction gear 3, 4. Turning tool 15 then carries out a circular pivoting movement about the axis of rotation of shaft 5 passing through $c_1$ and thus produces a highly accurate spherical shape on the workpiece to be machined.

The magnitude of the pivoting angle, which is a function of the magnitude of the spherical segment to be produced, is picked up by shaft encoder 9 connected via toothed-belt gearing 6, 7, 8 and processed in a CNC as an electric signal in a manner known per se.

It is thereby possible to enter the magnitude of the pivoting angle as a parameter in the CNC either directly or via a program.

The operation of automatic tool correction is initiated by recalling a subroutine; it will be explained below with reference to FIGS. 4, 5, 7, 8, and 9. In this connection, it is assumed that the correction value has already been entered in the CNC.

First, via friction gear 3, 4, feed motor 2 rotates shaft 5 and all parts 13, 14, 15 connected to it, as well as disk 19 and piston 16 connected to it, into a position offset by ten degrees relative to the zero position. The zero position is that in which the cutting edge of turning tool 15 is situated on the axis of rotation of the workpiece to be machined (the axis of the lathe; see FIGS. 2, 4, and 9A). In this position, groove 1B and lug cam 22 are situated opposite one another so that they can engage. In order to prevent the cam and groove from touching during engagement, a safety margin B is provided (FIG. 9B). Moreover, tool-fastening plate 13 is held fast to shaft 5 by the magnetic force of permanent magnets 10. Screws 31 shown in FIG. 6 have no attachment function but are used merely as a safeguard and are tightened from above so that tool-fastening plate 13 can easily lift off shaft 5, as explained below. Now piston 16 is impinged upon by compressed air through bores 26, 27 and moves upward against the bias of a spring 25 to its limit stop. In so doing, it is freed from its force-locking connection to friction wheel 4, formed by a cone 30 (FIG. 5). As piston 16 and disk 19 connected thereto move upward, lug cam 22 engages groove 1B of disk 19 (FIG. 9B).

At the same time, the compressed air flows through bores 27 and reaches annular areas 29 interconnected by bores 28 (FIGS. 5, 7, 8).

Through the air pressure produced in annular areas 29, the cohesive effect of permanent magnets 10 is largely neutralized. Next, shaft 5 is rotated back toward the zero position by feed motor 2 (FIG. 9C). Owing to the existing frictional forces, piston 16 rotates along with shaft 5 until groove 18 strikes against cam 22. Now piston 16 can no longer rotate and is in the zero position; only shaft 5 still rotates through the remaining angle B until it, too, reaches the zero position. At the same time, tool-fastening plate 13 is moved into its zero position (FIG. 9C). Accumulations of errors are thus avoided, and the correction operation is faultless.

Starting from this zero position, feed motor 2 then rotates the whole system--shaft 5, piston 16, and disk 19 connected thereto--by 11 degrees in the opposite direction (FIG. 9D). After this path of travel, cam 22 strikes against the groove wall, and hence piston 16 cannot rotate any farther. However, shaft 5 continues to rotate by the calculated amount $a$, corresponding to the correction value entered (FIG. 9E) and, via eccentric shaft 17, linearly displaces tool-fastening plate 13 and, along with it, toolholder 14 with the chucked tool 15, by the desired correction value. During this time, block 20 slides in groove 21 (FIG. 7). To conclude the correction operation, the air is exhausted from the system described above, and the force-locking connection is thus restored.

The cohesion of permanent magnets 10 becomes effective again, piston 16 is pressed back into its force-locking connection to friction wheel 4, formed by cone 30 (FIG. 5), and disk 19 is disengaged from lug cam 22. The tool-correction subroutine is thereby terminated, and normal turning may be resumed.

For the sake of accuracy, the above-mentioned angular displacement is limited to an area in which the displacement of tool-fastening plate 13 brought about by the eccentric is substantially linear with the angular displacement. In other words, in the embodiment described, eccentric 17 can never move in a range greater than $\pm 5°$. Thus the maximum value for $a$ is 10°. In this connection, the rotational freedom of disk 19 in its upper position, i.e., when lug cam 22 is engaged in recess 18, is limited to 11°. In the embodiment described, the safety margin $\beta\pi$ against contact between cam and groove during engagement is equal to 1°.

During the operation, all rotational movements are measured by encoder 9 and communicated to the CNC. In the embodiment described, the eccentric is designed in such a way that an angular displacemnnt of 0.01 degrees corresponds to a correction of 0.5 um of the ball radius.

What is claimed is:

1. A ball turner for turning machines for producing spherical shapes, of the type having a base body, a feed motor, a vertically disposed rotary main shaft driven by the motor, a displaceable tool-fastening plate having a toolholder, and shaft encoder means operatively connected to the main shaft, wherein the improvement comprises:
   a vertically disposed auxiliary shaft coaxially mounted in said main shaft,
   an eccentric shaft disposed at the upper end of said auxiliary shaft,
   groove means operatively connecting said eccentric shaft to said tool-fastening plate,
   a wheel disposed at the lower end of said auxiliary shaft and including a recess,
   means for connecting said wheel to said eccentric shaft, and
   a fixed lug cam secured to said base body and engageable with said recess;
   wherein said auxiliary shaft is a piston, and further comprising pneumatic means for driving said piston, a spring disposed coaxially with and exerting a downward pressure on said piston, and at least one more in the lower part of said piston for the passage of compressed air exerting an upward pressure on said piston greater than said downward pressure of said spring, whereby said recess in said wheel is moved into engagement with said lug cam.

2. The ball turner of claim 1, further comprising a plurality of permanent magnets disposed on the bottom of said tool-fastening plate and embedded in circular areas machined in said main shaft for exerting a cohesive force upon said tool-fastening plate, and a plurality of further bores communicating with said annular areas for the passage of compressed air whereby said cohesive force is neutralized.

3. The ball turner of claim 2, wherein the rotational freedom of said disk and hence of said main shaft when said lug cam is engaged with said recess is about 11°.

4. The ball turner of claim 3, wherein for the avoidance of an accumulation of errors, every correction operation starts from an original, unvarying zero position.

5. The ball turner of claim 4, wherein the tool-fastening plate is displaced in linear direction by rotation of said main shaft when said eccentric shaft is held fast via said sliding block sliding in said groove, said eccentric shaft being capable of moving within a limited range in that the displacement of said tool-fastening plate caused by said eccentric shaft is still substantially linear with the angular displacement necessary for the correction.

6. A turning tool driving and adjusting device in a turning machine adapted for machining workpieces of spherical shapes, comprising a base body, a tool support rotatively movable about a vertical axis, motor means for driving said tool support about said axis, a table, means mounting the table on the tool support for movement along an adjustment axis perpendicular to said vertical axis, tool holder means secured to said table, securing means for releasably securing said table to said tool support, adjustment means on said tool support for moving the table on the adjustment axis, means on said tool support and table for releasing said securing means to allow relative movement between said tool support and said table along said adjustment axis, and control means for automatically and sequentially controlling rotative movements of said tool support about said vertical axis and effecting adjusting movements of said table with respect to said tool support along the adjustment axis.

7. A turning tool as in claim 6 wherein the motor means includes a friction gear for driving the tool support about said vertical axis.

8. A turning tool as in claim 6 wherein the adjustment means includes means responsive to rotation of the tool support for moving the table on the adjustment axis.

9. A turning tool as in claim 6 wherein the control means comprises a motor, an encoder, means coupling the motor, the encoder and the tool support for driving the tool support about its said vertical axis, and activating means for enabling operation of the adjustment means in response to rotation of the tool support by said motor.

* * * * *